United States Patent [19]

Maida et al.

[11] Patent Number: 5,387,852
[45] Date of Patent: Feb. 7, 1995

[54] METHOD OF DETERMINING TOOL RUNNING PATH IN N/C SYSTEM

[75] Inventors: Kazuhiro Maida; Shinji Tachikake; Satoru Yahagi; Atsushi Ohta, all of Hiroshima, Japan

[73] Assignee: Mazda Motor Corporation, Hiroshima, Japan

[21] Appl. No.: 91,045

[22] Filed: Jul. 14, 1993

[30] Foreign Application Priority Data

Jul. 14, 1992 [JP] Japan .................. 4-186627

[51] Int. Cl.$^6$ .................................. G05B 19/10
[52] U.S. Cl. ............................ 318/567; 318/569; 318/576; 318/570; 318/568.19; 364/474.25; 364/474.32
[58] Field of Search ............... 318/569, 568.19, 568.1, 318/570, 569, 576; 364/474.25, 474.32

[56] References Cited

U.S. PATENT DOCUMENTS

| | | | |
|---|---|---|---|
| 4,017,723 | 4/1977 | Fickes | 318/569 |
| 5,107,436 | 4/1992 | Levine et al. | 318/569 |
| 5,126,646 | 6/1992 | Fujita et al. | 318/569 |
| 5,223,777 | 6/1993 | Werner et al. | 318/569 |

FOREIGN PATENT DOCUMENTS 158018 8/1989 Japan .

Primary Examiner—William M. Shoop, Jr.
Assistant Examiner—Karen Masih
Attorney, Agent, or Firm—Sixbey, Friedman, Leedom & Ferguson

[57] ABSTRACT

In an numerical control machining system, a plurality of parts on a work are cut into predetermined shapes with one cutting tool by moving back and forth the cutting tool a plurality of times for each part to be cut. When determining a tool running path, a cutting trajectory of the cutting tool for each of the parts is obtained, all the end points of the cutting trajectory which can be a tool inlet end or a tool outlet end for each of the parts are stored, the part the cutting trajectory for which has an end point which is the nearest to the tool outlet end of the cutting trajectory for one of the parts as measured along the path of movement of the tool is determined to be the part to be cut next, and said nearest end point is determined to be the tool inlet end of the cutting trajectory for the part to be cut next.

3 Claims, 5 Drawing Sheets

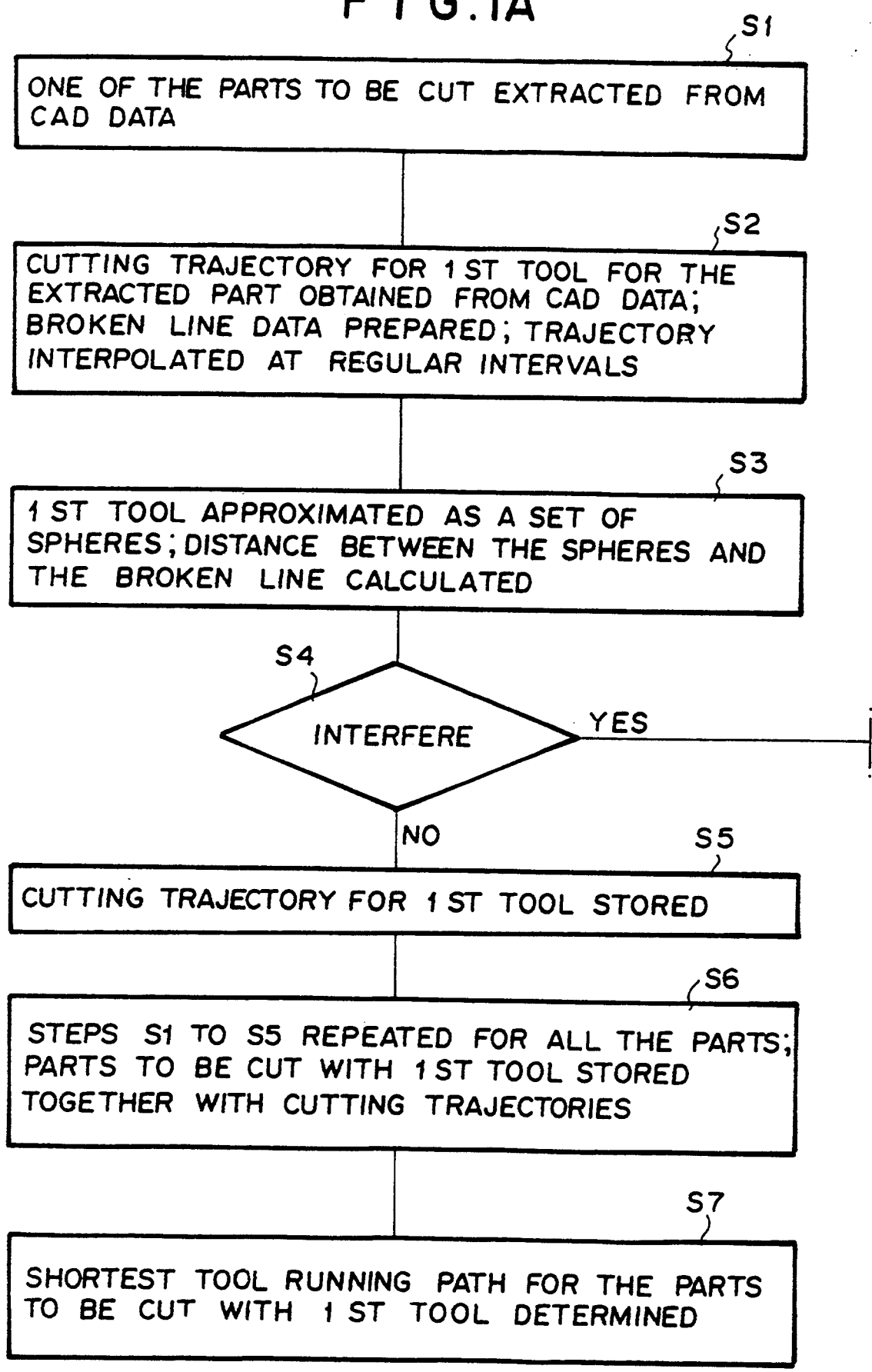

FIG. 1B

S8 — CUTTING TRAJECTORY FOR 2ND TOOL FOR THE PART INVOLVING INTERFERENCE OBTAINED FROM CAD DATA; BROKEN LINE DATA PREPARED; TRAJECTORY INTERPOLATED AT REGULAR INTERVALS

S9 — 2ND TOOL APPROXIMATED AS A SET OF SPHERES; DISTANCE BETWEEN THE SPHERES AND THE BROKEN LINE CALCULATED

S10 — INTERFERE?
- YES → S14 — STEPS S1 TO S12 REPEATED UNTIL TOOL FOR ALL THE PARTS IS DETERMINED
- NO → S11 — CUTTING TRAJECTORY FOR 2ND TOOL STORED

S12 — STEPS S8 TO S11 REPEATED FOR ALL THE PARTS INVOLVING INTERFERENCE; PARTS TO BE CUT WITH 2ND TOOL STORED TOGETHER WITH CUTTING TRAJECTORIES

S13 — SHORTEST TOOL RUNNING PATH FOR THE PARTS TO BE CUT WITH 2nd TOOL DETERMINED

APPROXIMATED PORTION
BROKEN LINE
TRAJECTORY

METHOD OF DETERMINING TOOL RUNNING PATH IN N/C SYSTEM

BACKGROUND OF THE INVENTION

1. Field of the Invention

This invention relates to a method of determining a tool running path in an N/C (numerical control) machining system.

2. Description of the Prior Art

Recently there has been put into wide use an automatic programming system in which a computer is employed to control an NC machining system.

For example, when a pressing die having a complicate curved surface is machined, the surface of a work is directly cut using N/C data prepared from CAD (computer-aided design) data without using a plaster master or the like.

The tool for cutting a work is first positioned away from the work and is moved toward the work to be brought into contact with the work at a part to be cut. After cutting the part, the tool is removed from the work, and is moved to another part to be cut if any, and finally is returned to the original position. The path along which the tool is moved during cutting operation on each part to be cut is determined on the basis of the shape of the surface to be formed thereon using the CAD data. In this specification, the path of the tool along which the tool is to be moved during cutting operation on each part to be cut will be referred to as "cutting trajectory", and the path of the tool along which the tool is to be moved in the whole cutting operation including the path along which the tool is moved toward the work from the original position to the tool inlet end of the cutting trajectory for the first part to be cut, the path along which the tool is returned to the original position from the tool outlet end of the cutting trajectory for the last part to be cut and the paths along which the tool is moved from part to part as well as the respective cutting trajectories will be referred to as "tool running path" in order to make a distinction therebetween.

When a plurality of parts of a work are to be cut, the tool running path is determined to pass a predetermined point so that the tool does not interfere with the work when moved from one part to another as disclosed, for instance, in Japanese Patent Publication No. 1(1989)-58018.

When preparing the N/C data from the CAD data, the cutting trajectories for the parts to be cut are first calculated on the basis of the CAD data and are edited. Then the cutting order of the parts (which determines the "tool running path") and the cutting conditions for the respective parts are determined and the N/C data is obtained by combining the cutting trajectories and the cutting conditions.

Conventionally the operator determines the cutting order of the parts and the cutting conditions for the respective parts on the basis of the cutting trajectories. However, since the number of the cutting trajectories to be calculated to cut the work into a predetermined three-dimensional shape is as large as several hundreds to several thousands, it takes a long time to prepare the N/C data and it is very difficult to minimize the tool running path.

SUMMARY OF THE INVENTION

In view of the foregoing observations and description, the primary object of the present invention is to provide a method of determining a tool running path in an N/C machining system in which the tool running path can be easily minimized when a plurality of parts on a work are cut with a cutting tool by moving the tool back and forth a plurality of times on each of the parts.

In accordance with the present invention, there is provided an improved method of determining the tool running path in an N/C machining system when a plurality of parts on a work are cut with a cutting tool by moving the tool back and forth a plurality of times on each of the parts. In the method of the present invention, all the end points of the cutting trajectory which can be a tool inlet end or a tool outlet end are stored for each part. Then the part the cutting trajectory for which has an end point which is the nearest to the tool outlet end of the cutting trajectory for one of the parts to be cut as measured along the path of movement of the tool is determined to be the part to be cut next and said nearest end point is determined to be the tool inlet end of the cutting trajectory for the part to be cut next.

BRIEF DESCRIPTION OF THE DRAWINGS

FIGS. 1A and 1B are diagrams illustrating a place where the method of the present invention is used.

DESCRIPTION OF THE PREFERRED EMBODIMENT

As shown in FIG. 1A, one of the parts to be cut on a work is extracted from CAD data. (step S1)

Then a cutting trajectory for the part when the part is to be cut with a first cutting tool is obtained on the basis of the CAD data. The first cutting tool is one of a plurality of (n in number) tools. At the same time, broken line data representing the curved surface into which the part is to be cut is prepared and the cutting trajectory is interpolated at a plurality of points at regular intervals. (step S2)

Figure 2A:
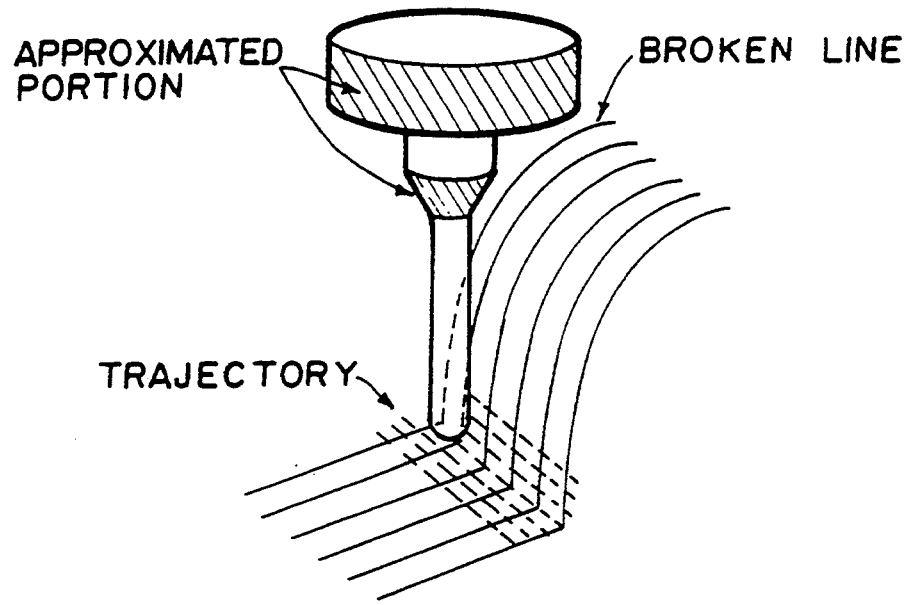
FIGS. 2A and 2B are schematic views for illustrating the method of determining whether a cutting tool interfere with a work.
Figure 2B:
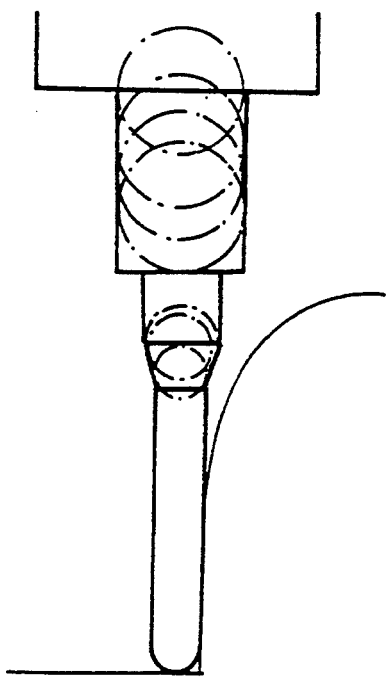
Figure 3A:
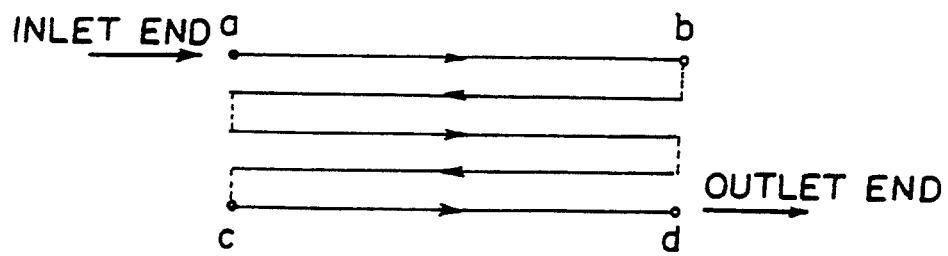
FIGS. 3A to 3D are schematic views for illustrating end points of a cutting trajectory which can be a tool inlet end or a tool outlet end.
Figure 3B:
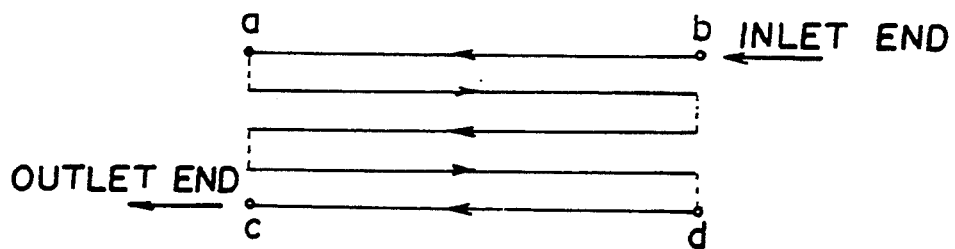
Figure 3C:
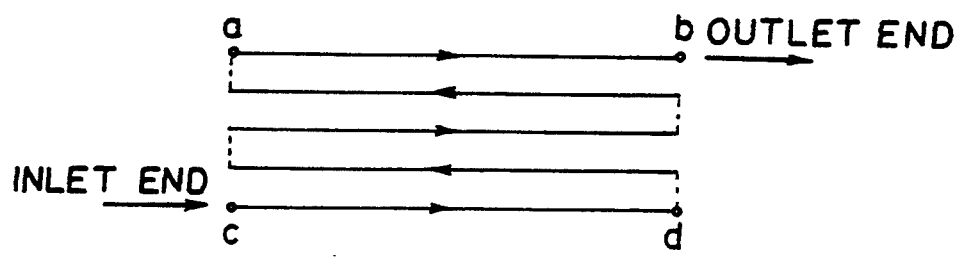
Figure 3D:
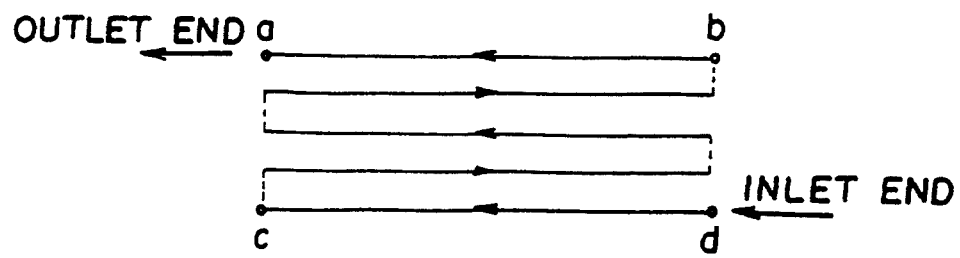

The tapered portion and the holder portion of the first cutting tool are approximated as a set of spheres and the distance between the spheres and the broken lines representing the curved surface at each point of interpolation is calculated as shown in FIGS. 2A and 2B. (step S3)

Then it is determined whether the first tool interferes with the work on the basis of the distances between the spheres and the broken lines at the respective points of interpolation. (step S4) When the distance between the spheres and the broken lines at at least one of the points of interpolation is smaller than a predetermined value, it is determined that the first tool interferes with the work.

When it is determined that the first tool does not interfere with the work, the cutting trajectory of the first cutting tool for the part to be cut is stored. (step S5)

Steps S1 to S5 are repeated for all the parts to be cut on the work and the parts to be cut with the first cutting tool are stored together with the cutting trajectories of the first cutting tool for them. (step S6)

Then the shortest tool running path is calculated for the parts to be cut with the first cutting tool. (step S7)

When it is determined in step S4 that the first tool interferes with the work for a certain part to be cut, a cutting trajectory for the part when the part is to be cut with a second cutting tool is obtained on the basis of the CAD data, as shown in FIG. 1B. At the same time, broken line data representing the curved surface into which the part is to be cut is prepared and the cutting trajectory is interpolated at a plurality of points at regular intervals in the manner similar to that in step S2. (step S8)

The tapered portion and the holder portion of the second cutting tool are approximated as a set of spheres and the distance between the spheres and the broken lines representing the curved surface at each point of interpolation is calculated in the manner similar to that in step S3. (step S9)

Then it is determined whether the second tool interferes with the work on the basis of the distances between the spheres and the broken lines at the respective points of interpolation. (step S10)

When it is determined that the second tool does not interfere with the work, the cutting trajectory of the second cutting tool for the part to be cut is stored. (step S11)

Steps S8 to S11 are repeated for all the parts which involve interference between the tool and the work when cut with the first cutting tool and the parts to be cut with the second cutting tool are stored together with the cutting trajectories of the second cutting tool for them. (step S12)

Then the shortest tool running path is calculated for the parts to be cut with the second cutting tool. (step S13)

Steps similar to steps S1 to S13 are repeated until the tools for all the part to be cut on the work and the cutting trajectories for them are determined. (step S14)

In this manner, the parts to be cut with the respective cutting tools and the cutting trajectories for the parts are determined and the shortest tool running paths are calculated for the parts to be cut with the respective tools.

The present invention is directed to provide an improved method of determining the shortest tool running path for the parts to be cut with one cutting tool which is applied, for instance, in step S7 or S13.

Now a method determining a tool running path in accordance with an embodiment of the present invention will be described with reference to FIGS. 3 to 5, hereinbelow.

Figure 4:
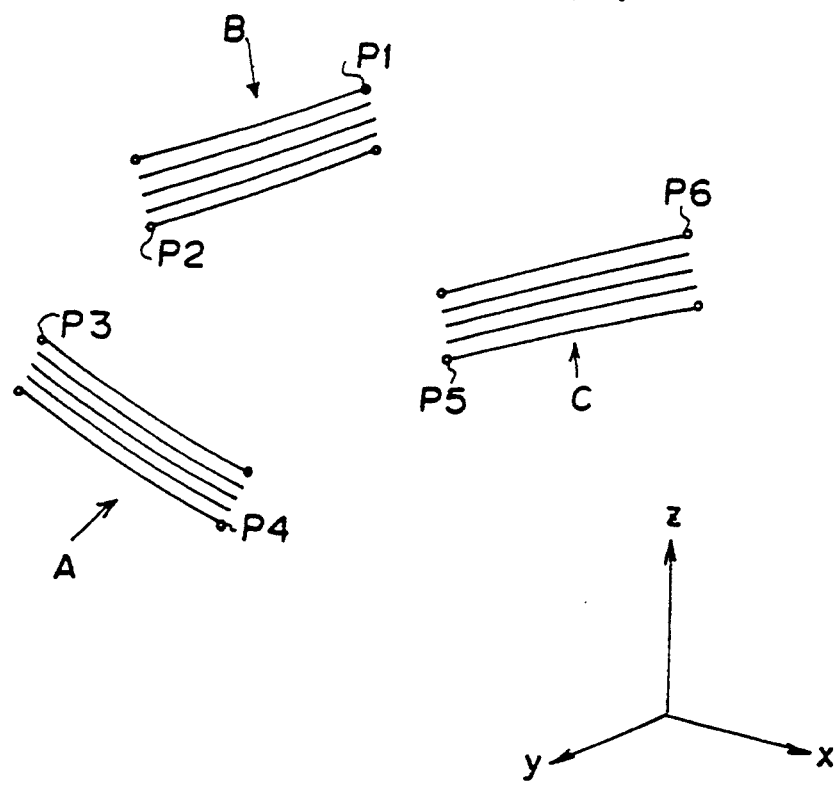
FIG. 4 is a schematic view for illustrating the method of determining the tool running path in accordance with the present invention.
Figure 5:
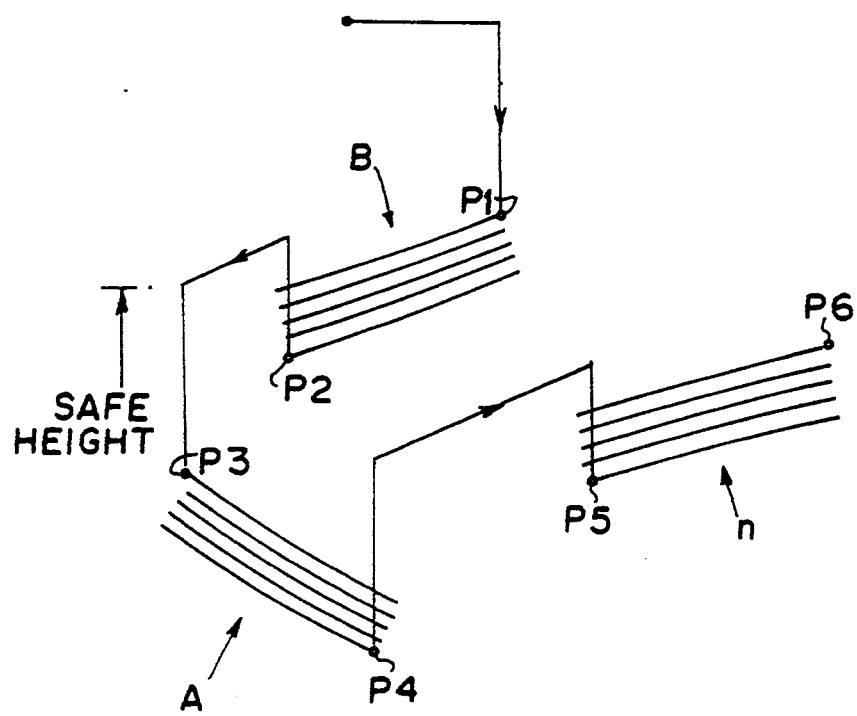
FIG. 5 is a schematic view for illustrating the method of determining the path along which the cutting tool is moved from the tool outlet end of a cutting trajectory to the tool inlet end of another cutting trajectory.

It is assumed that a work has three parts to be cut with one cutting tool as shown in FIGS. 4 and 5. Each part is represented by cutting trajectory (A, B, C) for the part, and the tool is moved back and forth a plurality of times when cutting each part as shown in FIGS. 4 and 5.

Each trajectory has four end points a to d which can be the tool inlet end (at which the cutting tool is brought into contact with the part of the work to begin cutting the part) or the tool outlet end (at which the cutting tool is removed from the work at the end of the cutting) as shown in FIGS. 3A to 3D. Such end points of each cutting trajectory are all stored in a memory.

As shown in FIG. 4, the cutting trajectory B is positioned highest in the three cutting trajectories A, B and C, and in order to prevent a portion without cutting edge of the cutting tool from being brought into contact with the work, the part corresponding to the cutting trajectory B is selected as the part to be cut first and the end point P1 which is positioned highest in the four end points of the cutting trajectory B is selected as the tool inlet end of the cutting trajectory B. When the tool inlet end of the cutting trajectory B is determined, the tool outlet end of the cutting trajectory B is determined as indicated at P2.

Then the distances between the tool outlet end P2 of the cutting trajectory B and the end points of the other cutting trajectories A and C are calculated. These distances should be measured along the path of movement of the cutting tool.

Out of the other cutting trajectories A and C, the cutting trajectory A having an end point indicated at P3 which is nearest to the tool outlet end P2 of the cutting trajectory B is determined to be the next cutting trajectory. The tool outlet end of the cutting trajectory A is readily determined to be the end point indicated at P4. Then the tool inlet end of the other cutting trajectory C should be the end point indicated at P5 and the tool outlet end of the same should be the end point indicated at P6.

Then the tool running path for this example is determined so that the cutting tool passes the points P1 to P6 in this order.

The path of movement of the cutting tool should be determined so that the cutting tool does not interfere with the work during movement of the cutting tool from the tool outlet end of one cutting trajectory to the tool inlet end of another cutting trajectory.

For this purpose, the cutting tool is once moved upward to a certain height above the surface of the work as shown in FIG. 5. Though the height may be set to be the height of the highest portion in the curved surface into which the work is to be cut, this elongates the path of movement of the cutting tool between the tool outlet end of one cutting trajectory and the tool inlet end of another cutting trajectory and the time required for the movement. In this embodiment, the maximum height in the area over which the cutting tool is moved is obtained from the broken line data used in selecting the cutting tool, and the height to which the cutting tool is lifted when moving from one part to another is set to a value obtained by adding a predetermined safe distance (the diameter of the cutting tool plus α) to the maximum height, thereby minimizing the time required for the movement.

What is claimed is:

1. A method of determining a tool running path in a numerical control machining system when cutting a plurality of separate parts of a work into predetermined shapes with one cutting tool from one part to another from a first part, the method comprising the steps of obtaining a cutting trajectory of the cutting tool for each of the parts, storing all end points of the cutting trajectory which can be one of a tool inlet end and a tool outlet for each of the parts, determining a part among said plurality of separate pans having a cutting trajectory which has an end point that is nearest to the tool outlet end of the cutting trajectory for said first part as the part to be cut next, and determining said nearest end point to be the tool inlet end of the cutting trajectory for the part to be cut next, and repeating said determining step until the tool running path reaches the part to be cut last.

2. A method as defined in claim 1 further comprising the steps of determining the part positioned highest in all the parts to be said first part, and determining the end point positioned highest in all the end points of the cutting trajectory for the first part to be the tool inlet end.

3. A method as defined in claim 1 further comprising steps of preparing line data representing a curved surface to be formed by cutting, obtaining a maximum height in an area over which the cutting tool is moved based on the line data, and determining a height to which the cutting tool is lifted when moving from one part to another by adding a predetermined safe distance to the maximum height.

* * * * *